United States Patent
Traub et al.

(10) Patent No.: US 7,434,360 B2
(45) Date of Patent: Oct. 14, 2008

(54) LANDSCAPE STAKE SYSTEM

(75) Inventors: Darren Traub, Irvine, CA (US); Jerry Crews, Los Alamitos, CA (US); Arthur Wagner, Geneva, IL (US)

(73) Assignee: Fibertech Polymers, Inc., Santa Ana, CA (US)

( * ) Notice: Subject to any disclaimer, the term of this patent is extended or adjusted under 35 U.S.C. 154(b) by 590 days.

(21) Appl. No.: 10/762,074

(22) Filed: Jan. 20, 2004

(65) Prior Publication Data

US 2005/0155310 A1    Jul. 21, 2005

(51) Int. Cl.
  *E02D 27/00* (2006.01)
(52) U.S. Cl. .............................. 52/102; 52/153; 52/155; 47/33
(58) Field of Classification Search .................. 52/153, 52/154, 155, 102, 103, 223.13, 223.1, 156, 52/159, 698, 699, 700; 47/33; 256/19; 404/136; 173/1, 128, 130
  See application file for complete search history.

(56) References Cited

U.S. PATENT DOCUMENTS

| | | | |
|---|---|---|---|
| 761,979 A * | 6/1904 | Moylan | ........................ 52/102 |
| 1,945,784 A * | 2/1934 | Myer | ........................ 404/136 |
| 3,891,189 A * | 6/1975 | Russo | ............................ 256/1 |
| 4,195,809 A * | 4/1980 | Morrison | ..................... 249/205 |
| 4,508,319 A * | 4/1985 | Tappan et al. | .................. 256/19 |
| 4,823,521 A * | 4/1989 | Kontz, Jr. | ..................... 52/102 |
| 5,097,912 A * | 3/1992 | Bowers | ........................ 173/90 |
| 5,256,006 A * | 10/1993 | Harding | ...................... 405/255 |
| 5,575,130 A * | 11/1996 | Chiodo | ......................... 52/713 |
| 5,857,493 A * | 1/1999 | Matz | ........................... 138/110 |
| 6,202,367 B1 * | 3/2001 | Marino et al. | .................. 52/102 |
| 6,854,945 B2 * | 2/2005 | Humphrey et al. | ........... 411/481 |
| 2002/0104260 A1 * | 8/2002 | Allen et al. | ..................... 47/33 |

\* cited by examiner

*Primary Examiner*—Richard E. Chilcot, Jr.
*Assistant Examiner*—William V Gilbert
(74) *Attorney, Agent, or Firm*—Orrick, Herrington & Sutcliffe LLP

(57) ABSTRACT

A landscape stake system comprises an improved stake and a hammer cap. The stake comprises a tapered lower region and an intermediate region. Preferably, the intermediate region comprises an I-beam format to provide reinforcement of the stake to prevent cracking of the stake during insertion of the stake into the ground. An upper region of the stake comprises a first U-shaped channel that is configured to receive a portion of a landscape edging board. The upper region of the stake further comprises a plurality of horizontal grooves and apertures configured to receive a fastener. The hammer cap comprises a substantially horizontal surface that is configured to receive the head of a hammer and a pair of vertical legs that form second channel and are configured to receive the upper region of the stake.

26 Claims, 9 Drawing Sheets

LANDSCAPE STAKE SYSTEM

FIELD OF THE INVENTION

This invention is directed to landscaping stakes configured to hold landscaping edging boards. This invention further relates to systems and methods for installation of such stakes.

BACKGROUND OF THE INVENTION

Landscape systems comprising stakes and bender boards, pliable boards and the like are often used to separate lawns and planting beds. Such systems are generally used to prevent the growth of grass or weeds from specified areas and to define separate areas of landscaping. In general, several stakes are positioned into the ground in pre-selected spots. An edging board, bender board, or other pliable board is then coupled with the stakes to form a border. Typically, fasteners are required to secure the edging board to the stake. Fasteners may include nails, screws, rivets, clips or the like that are inserted directly into the board or through apertures or pilot holes within the stake and coupled with the edging board.

Although systems have been developed which may obviate the need for fasteners, such systems have other disadvantages which are overcome by the present invention. One disadvantage of such systems is that the stake cannot be properly driven into the ground without subjecting the stake and edging board to stress which could result in breakage, deformation or cracking of the stake and edging board.

Inserting the stake into the ground to its proper depth may result in damage to the edging board and/or stake. In current systems, the edging board may become damaged because a downward force needs to be applied to the stake and edging board unit in order to drive the stake into the ground. If the force is applied directly to the edging board, the edging board may become damaged. The damaged edging board is more susceptible to cracking or splitting which reduces the ability of the edging board to maintain the border and overall aesthetics. If the force is applied directly to the stake, the stake may bend, crack, or split. This may result in the landscape edging board not being securely held in place.

Accordingly, an improved landscaping stake that can secure an edging board without the use of fasteners would be considered useful. In addition, a system and method for insertion of landscaping stakes which prevents damage to the stake and edging board would be considered useful.

SUMMARY OF THE INVENTION

The landscape stake system provides an improved stake design which reduces the likelihood of bending or cracking of the stake. In addition, the stake also provides for a spring-loaded fit to secure an edging board in place without the use of fasteners. Alternatively, fasteners may be used to further secure the edging board within the stake.

The stake comprises a lower region, an intermediate region and an upper region. The intermediate and lower regions include a continuous taper from the upper region to a boring tip. The intermediate region comprises a reinforced, I-beam construction. The I-beam has a center support which defines two lateral channels.

The upper region of the stake comprises a pair of lateral wings or vertical tabs. The vertical tabs define a first U-shaped channel that is configured to receive a first portion of the edging board. The interior walls of the channel may be smooth or may include tabs, protuberances, grips or the like, that are configured to secure the edging board. The width of the U-shaped channel may be greater in a lower region of the channel than in the upper region which allows for a spring-loaded fit when the edging board is inserted.

The upper region further comprises a plurality of horizontal grooves that are configured to receive the head of a fastener such as a screw or a nail. In addition, the grooves may comprise one or more apertures or holes that are dimensioned to receive the body of a fastener. The upper region may comprise raised ribs that define the grooves and which can be used as a grip for a user during insertion of the stake.

The landscape stake system further comprises a hammer cap that can be removably coupled with an upper portion of the stake during insertion of the stake into the ground. The hammer cap comprises an upper region and a lower region. The upper region includes a substantially horizontal strike surface. The lower region comprises a pair of vertical legs that form a second U-shaped channel. When the hammer cap is coupled with the upper end of the stake, the second U-shaped channel is coextensive with the first U-shaped channel and forms an edging board channel. Preferably, the height of the edging board channel is greater than the height of the edging board so that the hammer cap tends not to contact a top edge of the edging board. This configuration prevents the edging board from being damaged during insertion of the stake into the ground.

In operation, the stake is positioned such that the boring tip is aligned with a preselected position in the ground. The edging board is then inserted into the first U-shaped channel. The edging board may be further secured within the first channel by tabs on the interior wall of the first channel. Furthermore, one or more fasteners may be inserted into apertures within the upper region of the stake and coupled with the edging board.

During insertion of the stake into the ground, the hammer cap is coupled to the upper region of the stake. The user then applies a downward force on the upper region of the hammer cap. This forces the landscape stake system into the ground. Because the height of the edging board channel is substantially greater than the height of the edging board, when force is applied to the hammer cap, the edging board is not impacted.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that features and aspects of each embodiment can be combined and integrated with those of other embodiments.

DESCRIPTION OF THE PREFERRED EMBODIMENTS

As depicted in the figures, a landscape stake system of the present invention includes a stake 10 and a hammer cap 100 that is adapted to be removably coupled with the stake 10 during insertion of the stake 10 into the ground. The stake 10 of the present invention is designed to be fully inserted into the ground. This configuration allows the stake to be hidden which enhances the aesthetics of the stake system. Upon insertion of the stake 10 to an appropriate depth in the ground, the hammer cap 100 may be removed from the stake 10.

Figure 1:
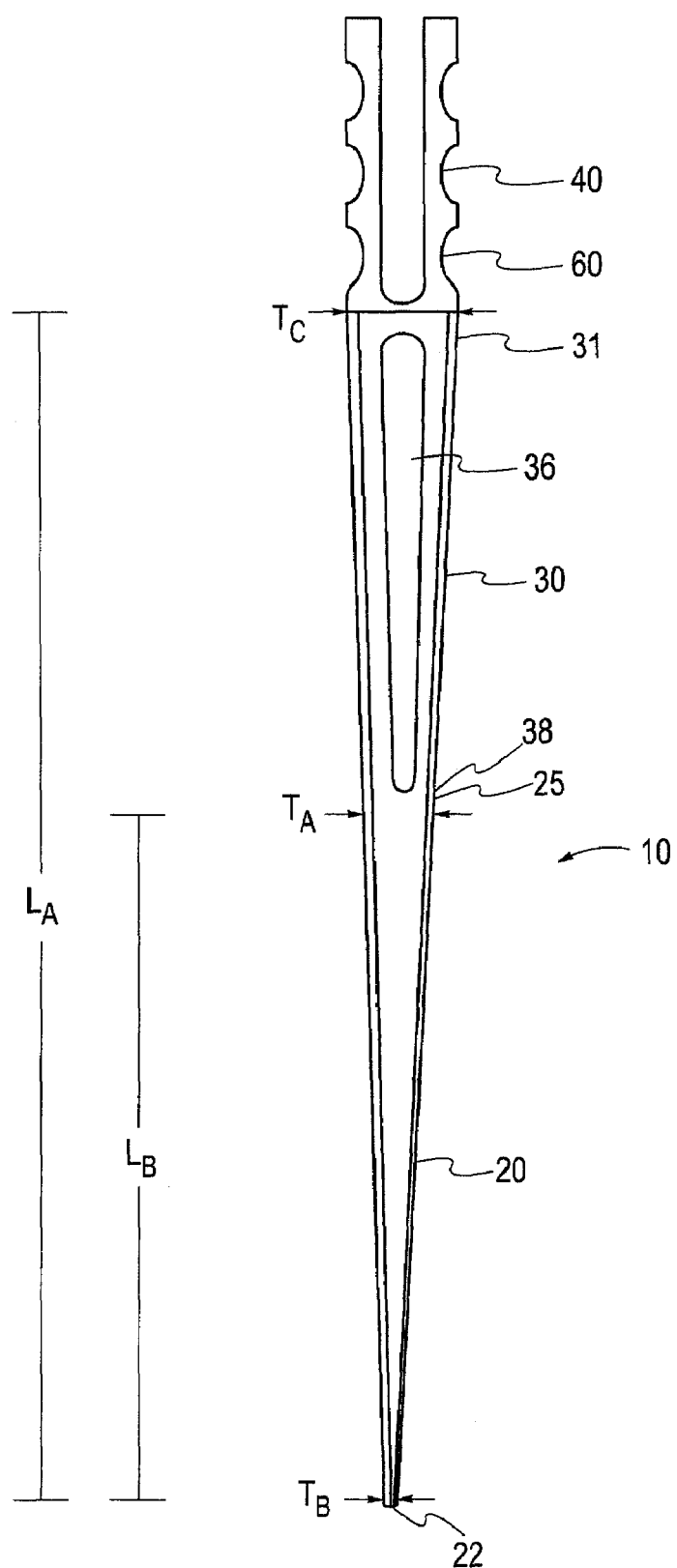
FIG. 1 shows a side view of an example embodiment of an improved stake.
Figure 2:
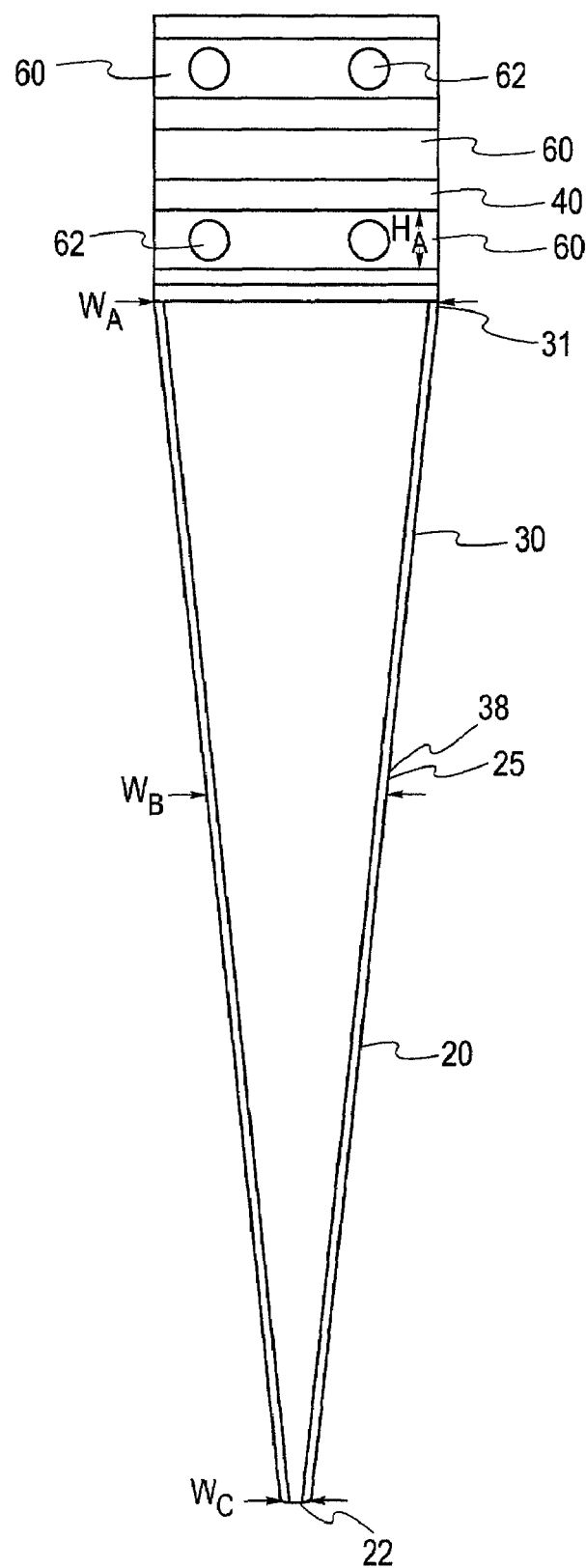
FIG. 2 shows a front view of an example embodiment of an improved stake.

As shown in FIGS. 1-2, the stake 10 comprises at least three regions, a lower region 20, an intermediate region 30 and an upper-region 40. In a preferred embodiment, the stake 10 is manufactured as a single structure. Alternatively, the stake 10 may be manufactured such that the upper region 40 is a separate piece that is attached to the intermediate region 30 and the lower region 20 in a separate step. The stake 10 may be comprised of a rigid plastic, plastic injection molded construction, fiberglass or other similar material. In a most preferred embodiment, the stake is comprised of plastic injection molded construction. Alternatively, the stake 10 may be made of any substantially rigid material such as fiberglass.

In a preferred embodiment, the length $L_A$ of the stake 10 is between 6 and 12 inches. Preferably, the length $L_A$ of the stake is between 8 and 11 inches and most preferably substantially 10.5 inches. The width $W_A$ of the stake at the upper region 40 is in the range of 1 to 3 inches (FIG. 2). As described further below, the width and thickness of the stake preferably tapers inward towards the lower end.

Figure 3:
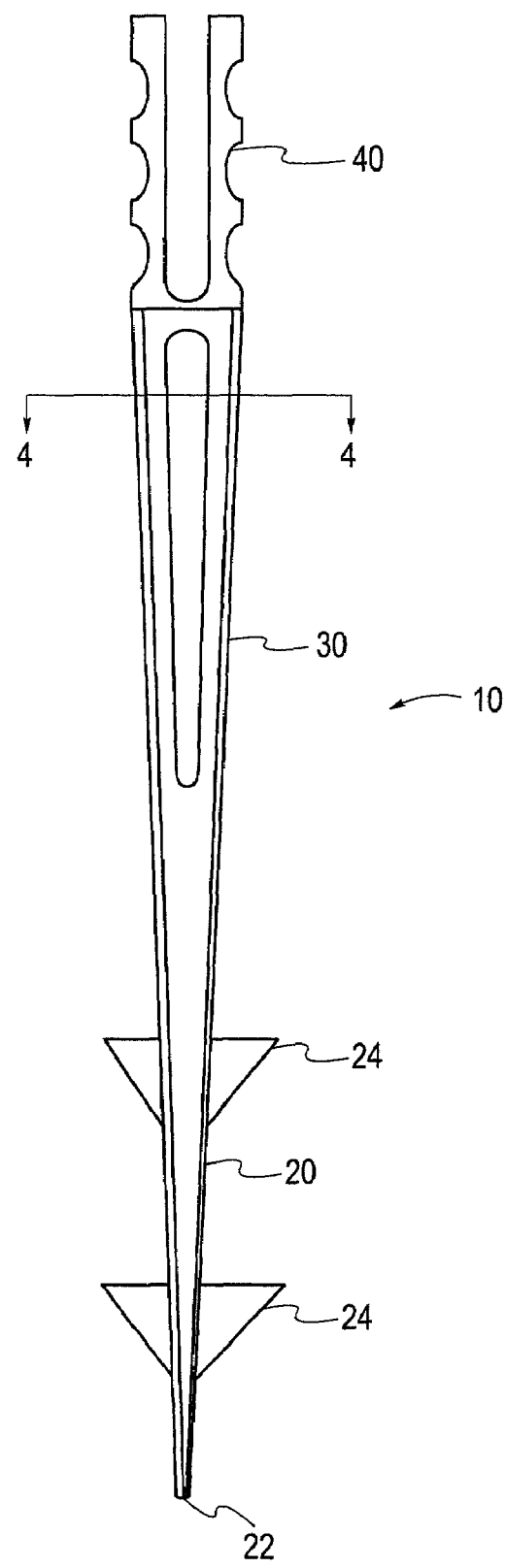
FIG. 3 shows a side view of an alternative embodiment of an improved stake.

The lower region 20 is configured to be inserted into the ground. In a preferred embodiment, the lower region 20 is substantially tapered. The end of the lower region 20 preferably forms a boring tip 22 or other pointed extension configured to facilitate the downward movement or boring of the stake 10 into the ground or earth. In a further embodiment, the lower region 20 may comprise lateral wings or fins 24 (FIG. 3). The lateral wings or fins 24 may be adapted to secure the stake 10 in position after the stake 10 is inserted into the ground.

The degree of tapering may vary. In a preferred embodiment, the degree of tapering is between 3 and 10 percent, most preferably in the range of 5 to 6 percent. The degree of tapering may be dependent on the overall length $L_A$ of the stake 10 such that, for example, the degree of tapering may be increased for shorter stakes.

In a preferred embodiment, the length $L_B$ of the lower region 20 is between 3 and 7 inches and most preferably is substantially 5 inches (FIG. 1). The thickness $T_A$ of the lower region 20 at its upper end 25 is substantially 0.5 inch and tapers to a thickness $T_B$ at the boring tip 22 of about 0.125 inch. Although it may vary, the width $W_B$ of the stake at the upper end 25 of the lower region 20 is substantially 1 inch and tapers to a width $W_C$ at the boring tip 22 of approximately 0.1875 inch (FIG. 2). The above specifications are exemplary and may vary based on the thickness of the bender board and the desired usage of the stake and the overall length of the stake.

The intermediate region 30 may have a fixed width and thickness or may be tapered as depicted in FIGS. 1 and 2. The intermediate region 30 and the lower region 20 may include a continuous taper from the base of the upper region to the boring tip 22. Preferably the width of the intermediate region tapers downward from the width $W_A$ at the base of the upper region 40 to the width $W_B$ at the upper end 25 of the lower region 20 (FIG. 2). In one embodiment, the width of the intermediate region tapers from substantially 1.75 inches at the upper end 31 of the intermediate region 30 to about 1 inch at the lower end 38 of the intermediate region 30. The thickness of the intermediate region 30 also preferably tapers from the upper end 31 downward to the lower end 38. In a preferred embodiment, the thickness $T_C$ of the intermediate region 30 at the upper end 31 of the intermediate region 30 is substantially 0.75 inches and the thickness $T_A$ at the lower end 38 of the intermediate region 30 is about 0.5 inches (FIG. 1).

Figure 4:
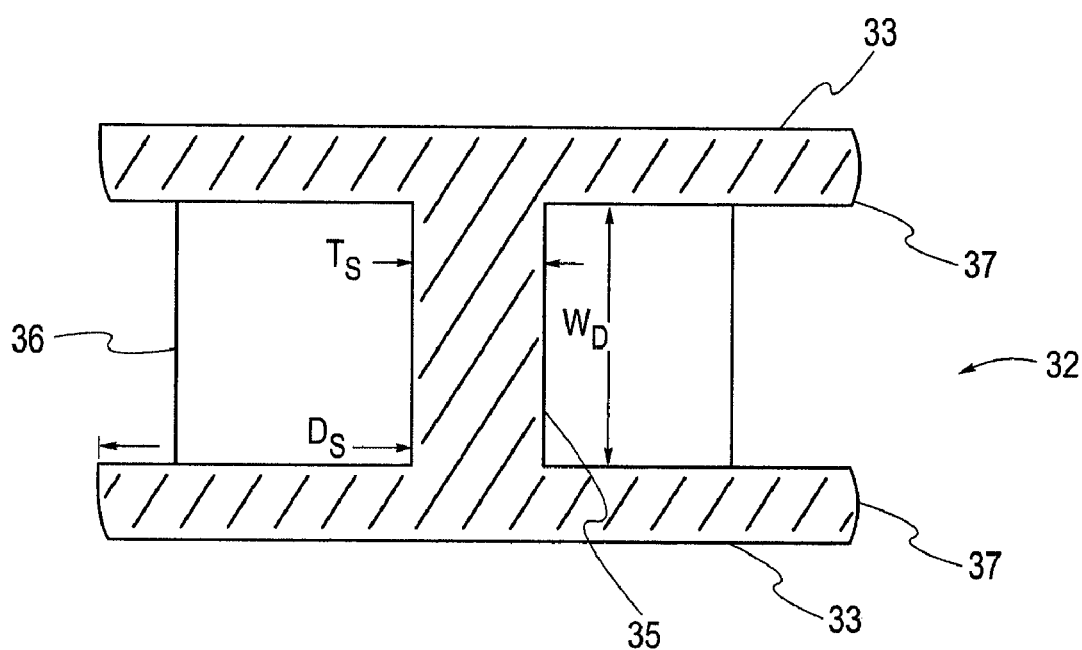
FIG. 4 shows a cross-section of an intermediate region of an improved stake taken along line 4-4 in FIG. 3.

The intermediate region may form a channel or, as shown in FIG. 4, in a most preferred embodiment, the cross-section of the intermediate region 30 may be formed as an I-Beam 32 with a central support 35. The I-Beam 32 is configured to maintain the strength of the stake 10 while allowing for lower production costs because of a reduction of material. The reinforced design reduces the likelihood that the stake 10 will bend, split, or break during insertion of the stake 10. The I-beam 32 preferably starts at a position substantially adjacent to the upper region 40 of the stake 10.

The I-beam 32 includes a central support 35 and a pair of cross members 33 defining recesses or lateral channels 36 on each side of the intermediate region 30. The dimensions of the central support 35 may vary depending on the application. Preferably, the length (not shown) of the central support 35 is substantially 3 to 3.5 inches. In a preferred embodiment, the width $W_D$ of the central support 35 is substantially uniform along its length. Although the thickness $T_S$ of the central support 35 may vary depending on the overall size of the stake 10, the thickness $T_S$ of the central support 35 preferably is in the range of 0.15 to 0.3 inches and most preferably is substantially 0.2 inches. Typically, the width $W_D$ of the central support 35 remains constant along the length of the I-beam 32.

The lateral channels 36 of the I-beam 32 of the intermediate region 30 extend from the central support 35 to the lateral edge 37 of the cross members 33. In a preferred embodiment, the depth $D_S$ of each of the lateral channels 36 tapers from the upper end 31 of the intermediate region 30 to the lower end 38. In a preferred embodiment, the depth $D_s$ of the lateral channels 36 tapers from approximately 0.75 inch at the upper end 31 to approximately 0.25 inch at the lower end 38 of the intermediate region 30. The height of the lateral channel 36 is substantially the same as that of the central support 35 and tapers downward from the upper end 31 to the lower end 38.

Figure 5:
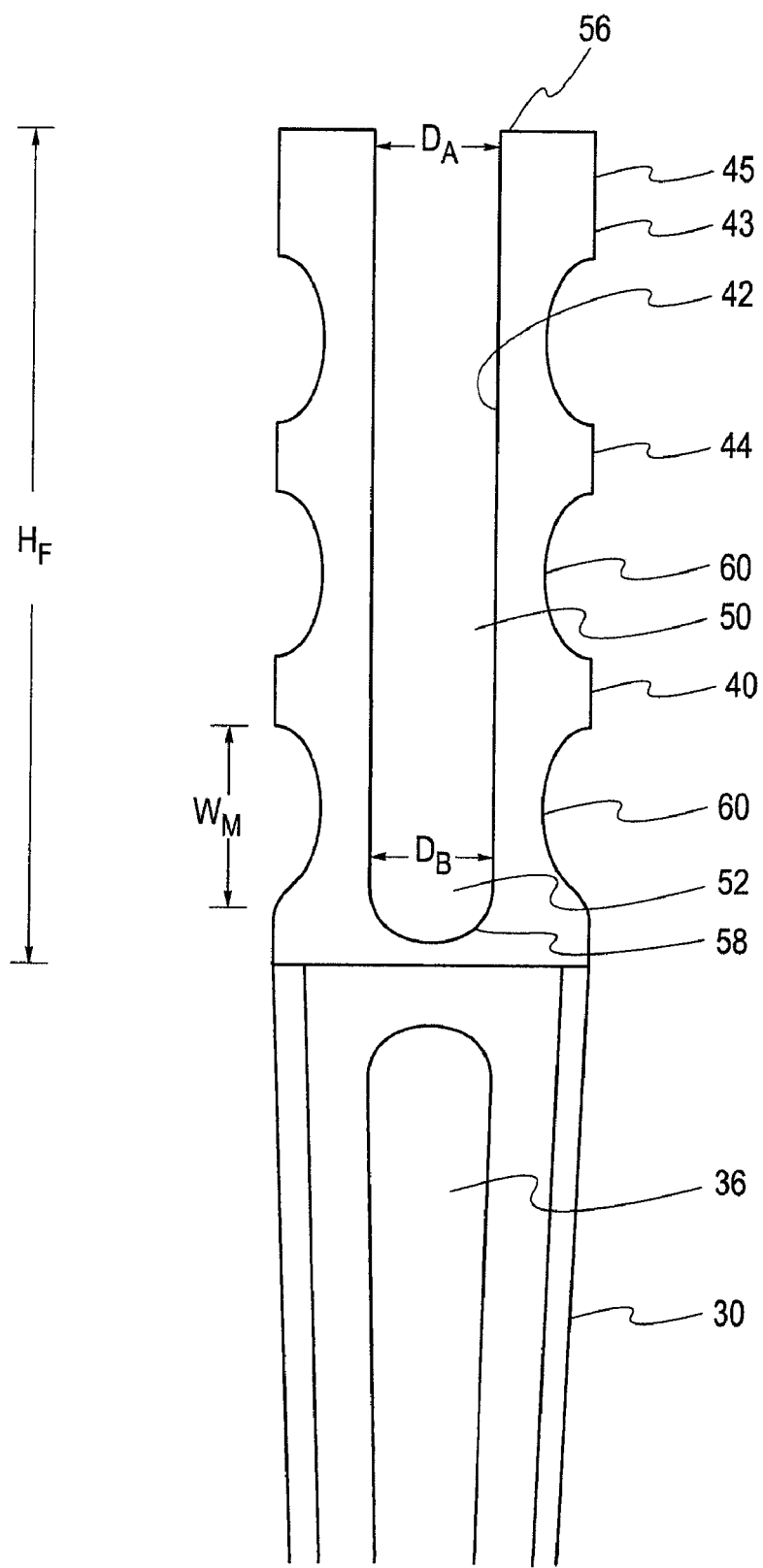
FIG. 5 shows an enlarged view of an upper region of an improved stake.
Figure 6:
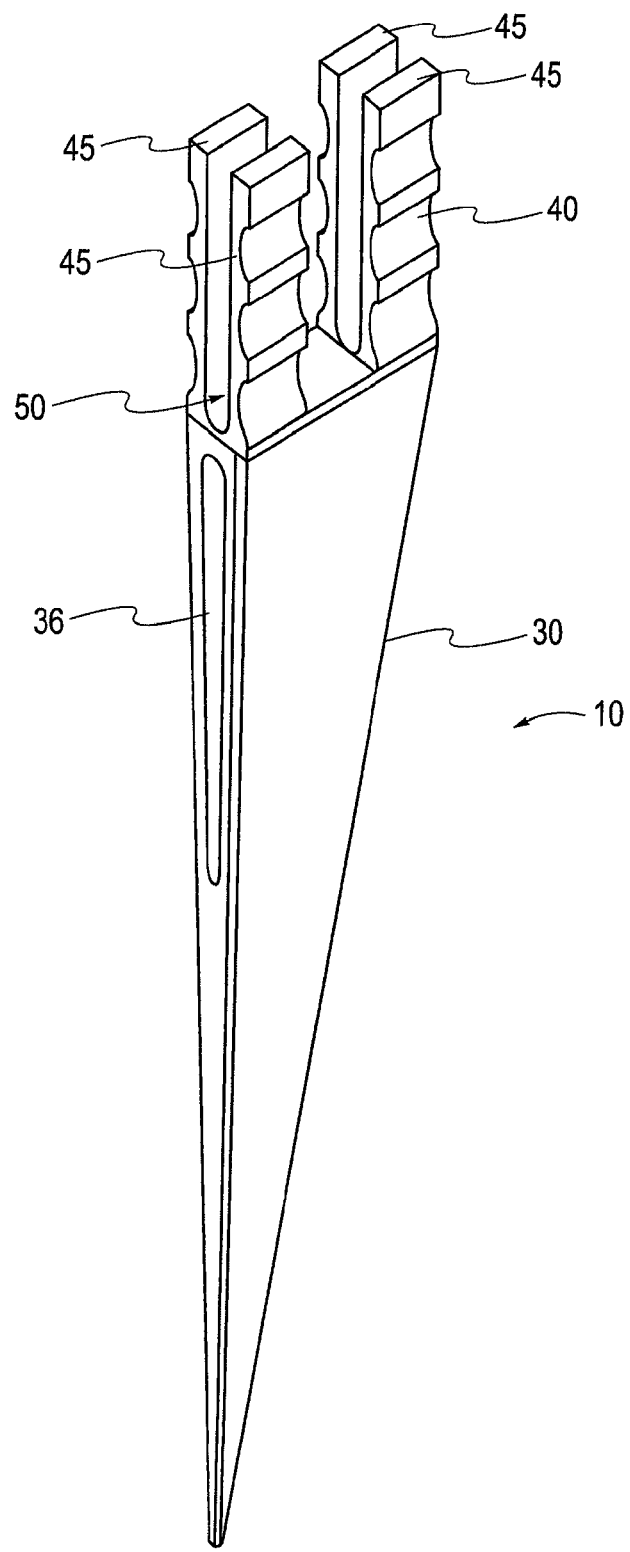
FIG. 6 shows a diagonal view of an alternative embodiment of the improved stake.
Figure 8:
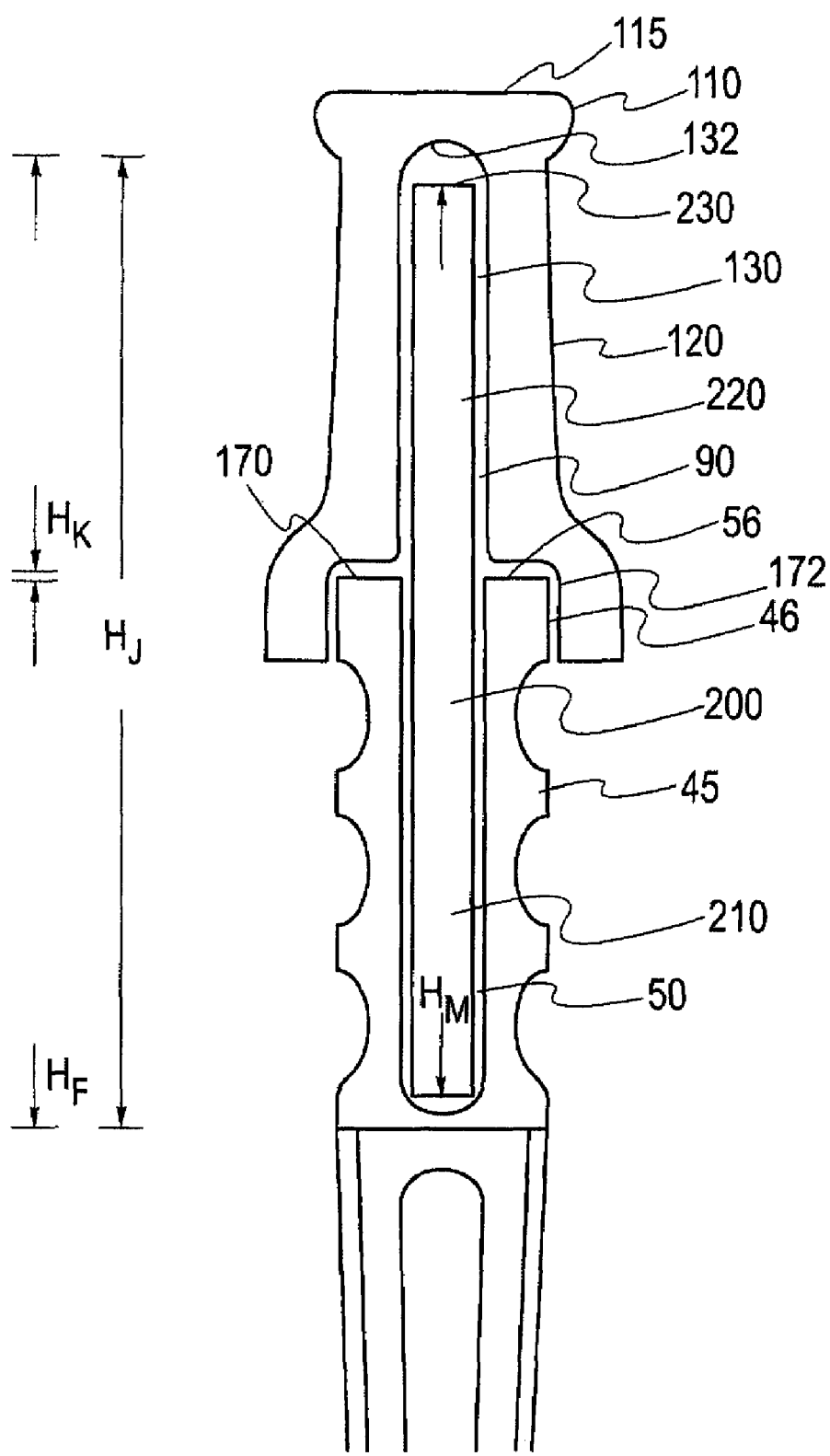
FIG. 8 shows a side view of an example embodiment of a landscape stake system.

Turning to FIG. 5, the upper region 40 of the stake 10 comprises a pair of substantially vertical arms or tabs 45. Alternatively, the upper region 40 may comprise four or more vertical arms or tabs 45 (FIG. 6). The vertical tabs 45 define a first U-shaped recess, groove, trough, or channel 50 that is configured to receive a first or lower portion 210 of an edging board 200 (FIG. 8). For example, the channel 50 may hold an intermediate portion of a single edging board 200 or it may join or hold the ends of two edging boards 200 together. As discussed further below, the dimensions of the channel 50 may vary depending on the size of the edging board 200.

The interior walls 42 of the vertical tabs 45 are preferably smooth. Alternatively, the interior walls 42 may comprise a plurality of detents, grips, protuberances or catches (not shown) that are adapted to retain the edging board 200 in a set or fixed position within the channel 50. The depth or height $H_E$ of the channel 50 may vary depending on the dimensions of the edging board 200. In general, the height $H_F$ may be between 1 and 4 inches. In a preferred embodiment, the height $H_F$ is substantially 2 inches. Therefore, in the preferred embodiment, the channel 50 is configured to receive approximately the bottom 2 inches of the edging board 200. The remaining second or upper portion 220 of the edging board 200 therefore extends above the channel 50.

The vertical tabs 45 may further comprise a plurality of horizontal grooves 60 on a lateral wall 43. The lateral wall 43 may comprise one or more raised ribs 44 defining the horizontal grooves therebetween. In a preferred embodiment, each vertical tab 45 comprises three horizontal grooves 60. The horizontal grooves 60 may be dimensioned such that the width $W_M$ of the horizontal groove 60 is slightly greater than the width or diameter of a head of a fastener (not shown), such as a screw, rivet, clip, nail, or the like. The width $W_M$ of the groove 60 may be between 0.3 and 0.5 inches and most preferably is about 0.3875 inches. If a fastener is used, the depth of the groove is such that the fastener is preferably inserted so that the head of the fastener is flush with or recessed from the lateral wall 43. This configuration allows for a more streamlined stake 10 which facilitates insertion of the stake 10 into the ground. The grooves 60 and raised ribs 44 may also be used as finger grips during insertion of the stake 10.

The horizontal grooves 60 may further comprise one or more openings, pilot holes, or apertures 62 configured to receive the body of a fastener (FIG. 2). The aperture 62 of one of the vertical tabs 45 may be aligned with the aperture 62 of the opposing vertical tab 45 to allow the body of a single fastener to be inserted through apertures 62 on both vertical tabs 45. Fasteners may be used to more fixedly secure the edging boards 200 into the channel 50. In particular, fasteners may be used to secure the ends of two or more edging boards 200 into place within a single stake 10.

Returning to FIG. 5, in a most preferred embodiment, the distance between the vertical tabs 45 narrows from the lower end 58 to the upper end 56 of the channel 50. This configuration results in a spring-loaded fit that facilitates securing the edging board 200 within the channel 50. Preferably, the material used for the vertical tabs 45 is flexible to facilitate receipt of the edging board 200 within the channel 50. Typically, a distance $D_A$ between the vertical tabs 45 at the upper end 56 is about 0.01 to 0.05 inches less than a distance $D_B$ between the vertical tabs 45 near the lower end 58. In one embodiment, the distance $D_A$ is about 0.3 inches and tapers outwardly to a distance $D_B$ of about 0.32 inches. However, the distances $D_A$ and $D_B$ may vary depending on the thickness of the edging board 200.

The bottom, lower portion 52 of the U-shaped channel 50 preferably is substantially rounded. For most edging boards 200, the bottom of the edging board tends not to contact the base of the channel 50. This reduces the amount of stress on the edging board 200 during insertion of the stake 10 and therefore reduces the likelihood of cracking or breaking the edging board 200 during this process.

Figure 7:
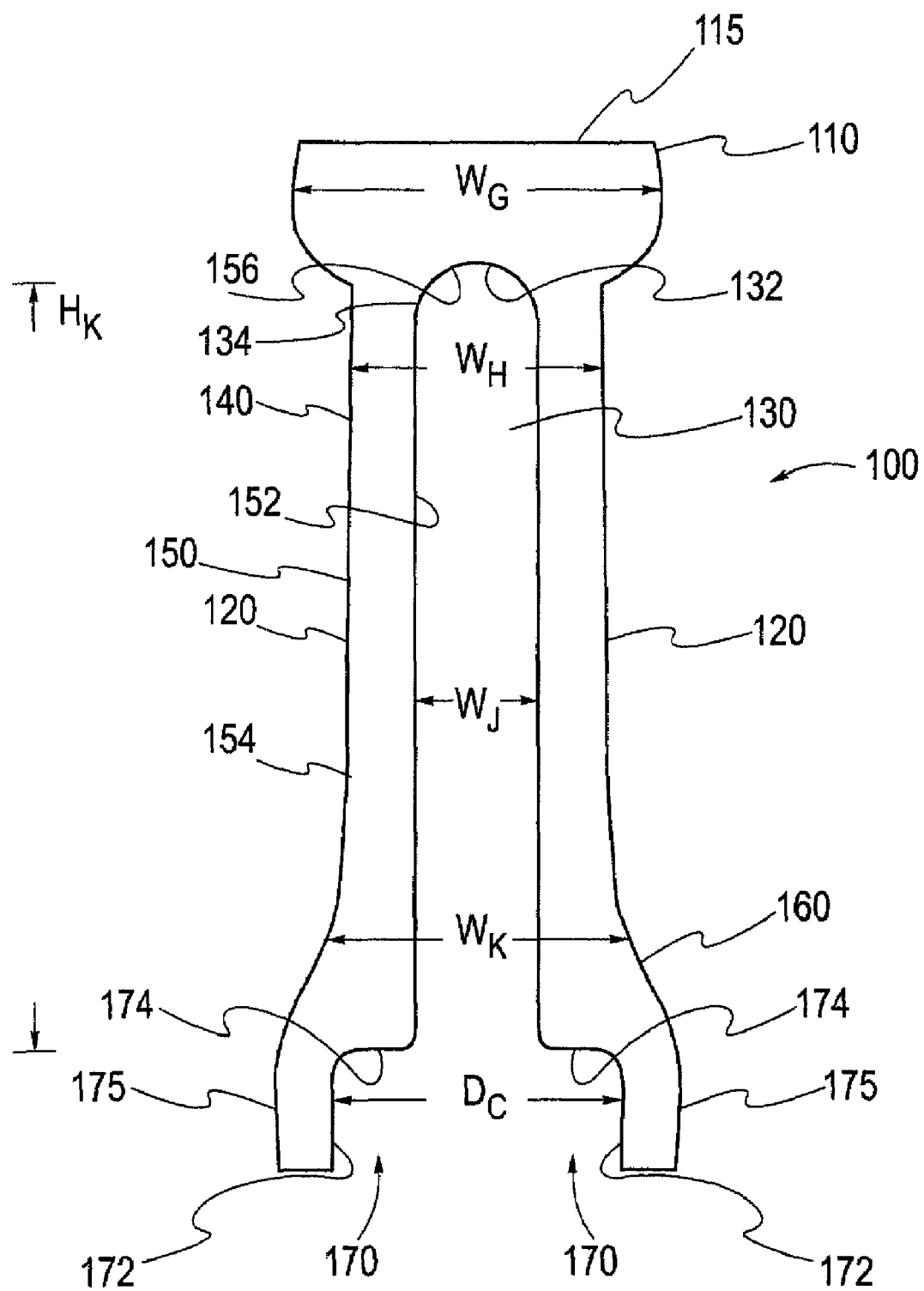
FIG. 7 shows a front view of an example embodiment of a hammer cap.

As shown in FIGS. 7 and 8, the hammer cap 100 is configured to be removably coupled with the upper region 40 of the stake 10. The hammer cap 100 is preferably manufactured as a single piece. The hammer cap 100 may be made of a rigid plastic, plastic injection molded construction, fiberglass, metal or other similar material.

The hammer cap 100 comprises an upper region 110 and a pair of vertical legs 120. The upper region 110 of the hammer cap 100 includes a substantially flat hammer or strike surface 115 configured to receive the head of a hammer or other object (not shown) which is used to drive the stake 10 into the ground or earth. In a preferred embodiment, the width $W_G$ of the upper region of the hammer cap is greater than the width $W_H$ of the adjacent portion of the vertical legs 120 to provide a finger guard. This allows the user to grasp the adjacent portion of the vertical legs 120 of the hammer cap 100 during use and reduces the likelihood that the user will be injured by an errant swing of the hammer.

The vertical legs 120 of the hammer cap 100 define a second U-shaped channel or trough 130 (FIG. 7). The trough 130 of the hammer cap 100 is configured to be coextensive with the channel 50 of the stake 10 when the hammer cap 100 is coupled with the stake 10 (FIG. 8). The width $W_J$ of the trough 130 may decrease from the upper end 132 of the trough 130 towards the lower end 136 of the trough 130 (FIG. 7). As shown in FIG. 8, when coupled with the stake 10, the trough 130 of the hammer cap 100 and the channel 50 of the stake 10 form an edging board channel 90. The height $H_K$ of the trough 130 plus the height $H_F$ of the channel 50 is dimensioned such that an upper end 230 of the edging board 200 tends not to contact an upper end 132 of the trough 130. That is the height $H_J$ of the edging board channel 90 is preferably greater than the height $H_M$ of the edging board 200. Therefore, the upper end 230 of the edging board 200 tends not to contact the upper end 132 of the trough 130 of the hammer cap 100. The hammer cap tends to prevent the force used to drive the stake into the ground from being transferred to the edging board. This allows the user to apply downward force to the hammer cap 100 without damaging the edging board 200. As with the dimensions of the upper region of the stake, the dimensions of the hammer cap 100 may be varied to accommodate varying sizes of edging boards 200.

Returning to FIG. 7, the vertical legs 120 of the hammer cap 100 each comprise a first region 140 and a second, lower region 160. The first region 140 comprises a pair of vertical walls 150 and an upper wall 156 that forms a rounded end 134 of the trough 130. Preferably the vertical walls 150 are substantially smooth both on the interior face 152 and the lateral face 154.

The lower region 160 of each vertical leg 120 of the hammer cap 100 may comprise a pair of cut outs, grooves, or slots 170 that are each configured to receive or mate with one of the two upper ends 56 of the vertical tabs 45 of the stake 10. The slots 170 may comprise a stepped wall 175 with a stop or abutment 174. Preferably, the slots 170 each comprise a vertical, lateral wall 172 that retains a lateral portion 46 of the vertical tab 45 (FIG. 8). The lateral wall 172 is configured to reduce the lateral displacement of the vertical tabs 45 during insertion of the edging board 200 which tends to reduce the chance that the vertical tabs 45 will break or split during this process.

Figure 9:
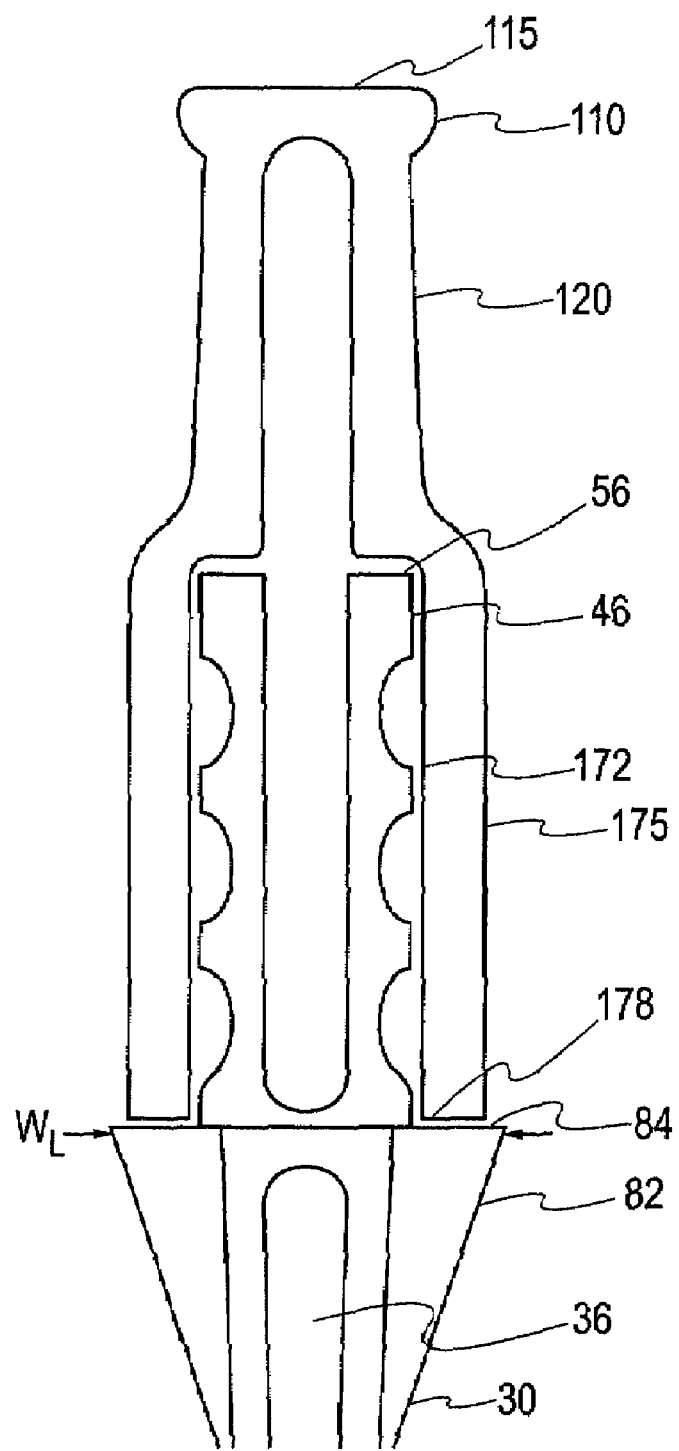
FIG. 9 shows a side view of a further embodiment of the landscape stake system.

In a further embodiment, the lateral wall 172 may extend downward to receive a lateral extension 82 of the intermediate region 30 (FIG. 9). The width $W_L$ of the lateral extension 82 is greater than the width $W_A$ of the base of the upper region 40. The lateral extension 82 further comprises a substantially horizontal abutment 84 that is configured to receive a lower end 178 of the lateral wall 172. In this embodiment, the lateral wall 172 of the hammer cap 100 is dimensioned such that the lower end 178 of the lateral wall 172 contacts the abutment 84 of the lateral extension 82 and tends not to contact the upper end 56 of the vertical tabs 45. Therefore, in this embodiment, the force applied to the hammer cap 100 during insertion of the stake 10 is not transferred to the vertical tabs 45. Instead, the force is transferred to the abutment 84 of the lateral extension 82 of the intermediate region 30.

In a preferred embodiment, the distance $D_C$ between the lateral walls 172 of the vertical legs 120 is greater than the distance $D_A$ between the upper ends 56 of the vertical tabs 45

(FIG. 5 and 7). The slots 170 may each further comprise a substantially flat, horizontal wall 174 that is configured to receive the upper end 56 of the vertical tab 45. The width $W_K$ of the lower region preferably tapers laterally above the slot 170 to provide reinforcement of the slot 170 (FIG. 7).

In operation, a user (not shown) may select various lengths $L_A$ for the stake 10 depending on the particular application. The user will direct the boring tip 22 of the stake 10 into a preselected spot in the ground. A landscaping edging board 200 may then be inserted into a first U-shaped channel 50 within an upper region 40 of the stake 10 (FIG. 5 and 8). A single edging board 200 may be inserted, or the ends of two edging boards 200 may be inserted into the channel 50. In a further embodiment, the user may secure the edging board 200 within the channel 50 by using one or more fasteners, such as nails, rivets, clips, screws or the like. The upper region 40 of the stake 10 typically comprises a plurality of horizontal grooves 60 and one or more apertures 62. The horizontal grooves 60 are dimensioned to receive the head of the fastener. The apertures 62 are configured to receive the body of the fastener. The user may insert a fastener through an aperture 62 and into the edging board 200. Preferably, the user advances the fastener such that the head of the fastener lies within one of the horizontal grooves 60. The body of the fastener may be directed through a second aperture 62 on the opposite vertical tab 45 if desired. The user may insert more than one fastener. In a further embodiment, tabs or slots (not shown) on the interior wall of the channel 50 may engage the edging board 200 and secure the edging board 200 within the channel 50. These tabs may be present in addition to, or in lieu of, the apertures 62. Alternatively, the edging board 200 may be placed into the channel 50 after inserting the stake 10 to a desired depth in the ground.

The user would then place a lower region 160 of the hammer cap 100 on the upper end 56 of the stake 10 (FIG. 8). The upper end 56 of each vertical tab 45 of the stake 10 is received by a slot 170 of the hammer cap 100. The slot 170 comprises a lateral wall 172 that retains or mates with a lateral portion 46 of the vertical tab 45 during operation. The hammer cap 100 comprises a second U-shaped channel or trough 130 that is coextensive with the channel 50 of the stake 10 when the hammer cap 100 is coupled with the stake 10. The combination of the trough 130 and the channel 50 creates an edging board channel 90. The edging board 200 or edging boards 200 are placed within the edging board channel 90. The edging board channel 90 is dimensioned such that a second portion 220 of the edging board 200 tends not contact the upper end 132 of the trough 130. That is, the height $H_J$ of the edging board channel 90 is greater than the height $H_M$ of the edging board 200. This ensures that the edging board 200 is not damaged during placement of the stake 10.

The user then applies a downward force onto the hammer cap 100. This downward force is then transferred to the stake 10 from the hammer cap 100 and drives the stake 10 into the ground without transferring the force to the edging board 200. The user continues to apply downward force until the stake 10 has been inserted to the proper depth within the ground. In a preferred embodiment, the stake is inserted such that the entire stake is underground. The hammer cap 100 can then be removed from the stake 10.

While the invention is susceptible to various modifications and alternative forms, specific embodiments thereof have been shown in the drawings and are herein described in detail. It should be understood, however, that the invention is not to be limited to the particular form disclosed, but to the contrary, the invention is to cover all modifications, equivalents, and alternatives falling within the spirit and scope of the appended claims.

The invention claimed is:

1. A landscape stake system receiving a landscape edging board, comprising:
    a stake member comprising a tapered lower region for insertion into the ground, an upper region having a first channel formed therein for receiving a first portion of the landscape edging board, and an intermediate region extending between the upper and lower regions, wherein the upper region includes at least two vertical tabs extending vertically from the intermediate region in a direction opposite of the lower region of the stake member and forming opposing walls of the first channel;
    an edging board having a rectangular cross section in the vertical direction and being received in said first channel; and
    a hammer cap comprising a first region having a striking surface member and a second region having vertical legs extending from the striking surface member and forming opposing walls of a second channel for receiving a second portion of the landscape edging board, wherein the vertical legs of the hammer cap being operably couplable with the vertical tabs of the stake member wherein the striking surface member is maintained in spaced relation with the stake member, and wherein the first and second channels combine to form an open-ended edging board channel having four walls formed by the first and second vertical legs and tabs, the striking surface member and the intermediate region of the stake member that extend about the landscape edging board when received therein and allow the landscape edging board to freely extend out the open ends of the edging board channel whereby upon installation of the stake and edging board the hammer cap is removed to expose the edging board.

2. The landscape stake system of claim 1, wherein the intermediate region comprises a center supporting rib.

3. The landscape stake system of claim 1, wherein the intermediate region comprises I-beam construction.

4. The landscape stake system of claim 1, wherein the lower region further comprises lateral fins.

5. The landscape stake system of claim 1, wherein the vertical tabs further comprise a plurality of substantially horizontal grooves.

6. The landscape stake system of claim 5, wherein the plurality of horizontal grooves are dimensioned to receive the head of a fastener.

7. The landscape stake system of claim 1, wherein the vertical tabs further comprise one or more apertures, each aperture being dimensioned to receive the body of a fastener.

8. The landscape stake system of claim 1, wherein the intermediate region is tapered.

9. The landscape stake system of claim 1, wherein the width of the first channel at an upper portion of the first channel is smaller than the width at a lower portion of the first channel.

10. The landscape stake system of claim 1, wherein the first and second channels form the edging board channel when the vertical walls of the hammer cap are coupled to the at least two vertical tabs of the upper region of the stake member, wherein the height of the edging board channel is greater than the height of the landscape edging board wherein a gap remains between the top of the landscape edging board and the striking surface member of the first region of the hammer cap during insertion of the lower region into the ground.

11. The landscape stake system of claim 1, wherein the width of the first region of the hammer cap is greater than the width of an upper portion of the second region, thereby defining a finger guard.

12. The landscape stake system of claim 1, wherein the intermediate and lower region comprise a continuous taper.

13. The landscape stake system of claim 1, wherein the hammer cap is configured to receive the upper region of the stake member.

14. The landscape stake system of claim 1, wherein the width of an upper portion of the intermediate region is greater than the width of the upper region.

15. The landscape stake system of claim 14, wherein the hammer cap is configured to receive an upper portion of the intermediate region of the stake member.

16. A landscape stake system, comprising:
   a stake member having first and second arms extending from a base forming a first recess;
   an edging board having a rectangular cross section in the vertical direction and being received in said first recess; and
   a cap having first and second legs extending from a strike surface member to form a second recess, the first and second legs of the cap being operably coupled to the first and second arms of the stake wherein the strike surface member remains in spaced relation with the stake member and wherein the first and second recess coextensively form an open-ended channel having four walls formed by the first and second legs and arms, the base of the stake member and the strike surface member of the cap that extend about four sides of a landscape board when received therein and allow the landscape board to freely extend out through the open ends of the open-ended channel whereby upon installation of the stake and edging board the hammer cap is removed to expose the edging board.

17. The landscape stake system of claim 16, wherein the stake member further comprises a pair of vertical tabs.

18. The landscape stake system of claim 17, wherein the pair of vertical tabs each comprise a plurality of horizontal grooves.

19. The landscape stake system of claim 17, wherein the pair of vertical tabs each comprise one or more apertures being configured to receive a fastener.

20. A stake and hammer cap receiving a landscape edging board, comprising:
   a lower region configured to be inserted into the ground and including a tapered tip;
   an intermediate region extending from the lower region and comprising a tapered region;
   an upper region extending from the intermediate region and having at least two substantially vertical tabs defining a first channel dimensioned to receive a portion of the landscape edging board;
   an edging board having a rectangular cross section in the vertical direction and being received in said first channel; and
   a hammer cap having a strike surface member and vertical walls extending from the strike surface member defining a second channel, the vertical walls of the hammer cap being couplable with the vertical tabs of the upper region wherein the strike surface member is maintained in spaced relation to the upper region and wherein the first and second channels combine to form an open-ended board channel having four walls extending about the landscape edging board when received therein and allowing the landscape edging board to freely extend out through the open ends of the board channel whereby upon installation of the stake and edging board the hammer cap is removed to expose the edging board.

21. The stake of claim 20, wherein a distance between the vertical tabs at an upper portion of the channel is smaller than a distance between the vertical tabs at a lower portion of the channel.

22. The stake of claim 20, wherein the vertical tabs further comprising a plurality of substantially horizontal grooves, each horizontal groove being dimensioned to receive the head of a fastener.

23. The stake of claim 20, wherein the horizontal grooves define one or more apertures, each aperture being dimensioned to receive a fastener.

24. The stake of claim 20, wherein the intermediate region further comprises an I-beam.

25. The stake of claim 20, wherein the intermediate region and the lower region comprise a continuous taper.

26. The stake of claim 20, wherein the lower region further comprises one or more lateral fins.

* * * * *